(12) United States Patent
Lin (10) Patent No.: US 12,436,723 B2
(45) Date of Patent: Oct. 7, 2025

(54) DISPLAY CARD WITH NOISE REDUCTION MECHANISM

(71) Applicant: TAIWAN MICROLOOPS CORP., New Taipei (TW)

(72) Inventor: Chun-Hung Lin, New Taipei (TW)

(73) Assignee: TAIWAN MICROLOOPS CORP., New Taipei (TW)

( * ) Notice: Subject to any disclaimer, the term of this patent is extended or adjusted under 35 U.S.C. 154(b) by 349 days.

(21) Appl. No.: 18/220,749

(22) Filed: Jul. 11, 2023

(65) Prior Publication Data

US 2024/0354038 A1 Oct. 24, 2024

(30) Foreign Application Priority Data

Apr. 21, 2023 (TW) ................................. 112114969

(51) Int. Cl.
*G06F 3/14* (2006.01)
*G06F 1/20* (2006.01)
*G10K 11/175* (2006.01)
*G10K 11/178* (2006.01)

(52) U.S. Cl.
CPC ............ *G06F 3/14* (2013.01); *G10K 11/1752* (2020.05); *G10K 11/178* (2013.01); *G06F 1/20* (2013.01)

(58) Field of Classification Search
CPC ......... G06F 3/14; G06F 1/20; G10K 11/1752; G10K 11/178

USPC ........................................................ 381/71.1
See application file for complete search history.

(56) References Cited

U.S. PATENT DOCUMENTS

| | | | |
|---|---|---|---|
| 12,374,316 B2 * | 7/2025 | Lin .................... | G10K 11/1785 |
| 2009/0092261 A1 * | 4/2009 | Bard ..................... | G06F 1/3203 |
| | | | 381/71.1 |
| 2009/0195922 A1 * | 8/2009 | Urmanov ............. | G11B 25/043 |
| | | | 360/97.19 |
| 2010/0002890 A1 * | 1/2010 | Lyon ................ | G10K 11/17881 |
| | | | 381/71.5 |
| 2013/0272534 A1 * | 10/2013 | Costa ................. | H05K 7/20209 |
| | | | 381/71.3 |

\* cited by examiner

*Primary Examiner* — David L Ton
(74) *Attorney, Agent, or Firm* — HDLS IPR SERVICES; Chun-Ming Shih (57) ABSTRACT

A display card includes a circuit board, a graphic processing unit and a noise reduction module. The circuit board has multiple gold fingers. The graphic processing unit is disposed on the circuit board. The noise reduction module is disposed on and electrically connected to the circuit board. The noise reduction module includes an active noise cancellation and a speaker electrically connected to the active noise cancellation. The speaker is capable of emitting a noise reduction sound to offset a noise from surrounding environment by the noise reduction sound. Thereby, the disclosure can effectively overcome the disturbing problem of noise.

11 Claims, 9 Drawing Sheets

DISPLAY CARD WITH NOISE REDUCTION MECHANISM

BACKGROUND

Technical Field

The disclosure relates to a technical field of display cards, particularly to a display card with a noise reduction mechanism.

Related Art

Due to the improvement of the graphics software and its imaging function, the display chip of a display card processing images has also greatly improved its computing power, and the relative follow-up is that the problem of heat generation and heat dissipation of the processor (GPU) needs to be solved.

In the cooling design of display cards, in addition to the water cooling, many display cards still use air cooling to dissipate heat. A common way is to blow away the heat from the electronic heat source to achieve the purpose of heat dissipation. It is the easiest and economical way to increase the speed of the fan to provide a large amount of airflow. However, this method produces relatively large noises.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

SUMMARY

An object of the disclosure is to provide a display card with a noise reduction mechanism, which uses the noise reduction module to effectively overcome the disturbing problem of noise.

To accomplish the above object, the disclosure provides a display card with a noise reduction mechanism, which includes a circuit board, a graphic processing unit and a noise reduction module. The circuit board has multiple gold fingers. The graphic processing unit is disposed on the circuit board. The noise reduction module is disposed on and electrically connected to the circuit board. The noise reduction module includes an active noise cancellation and a speaker electrically connected to the active noise cancellation. The speaker is capable of emitting a noise reduction sound to offset a noise from surrounding environment by the noise reduction sound.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
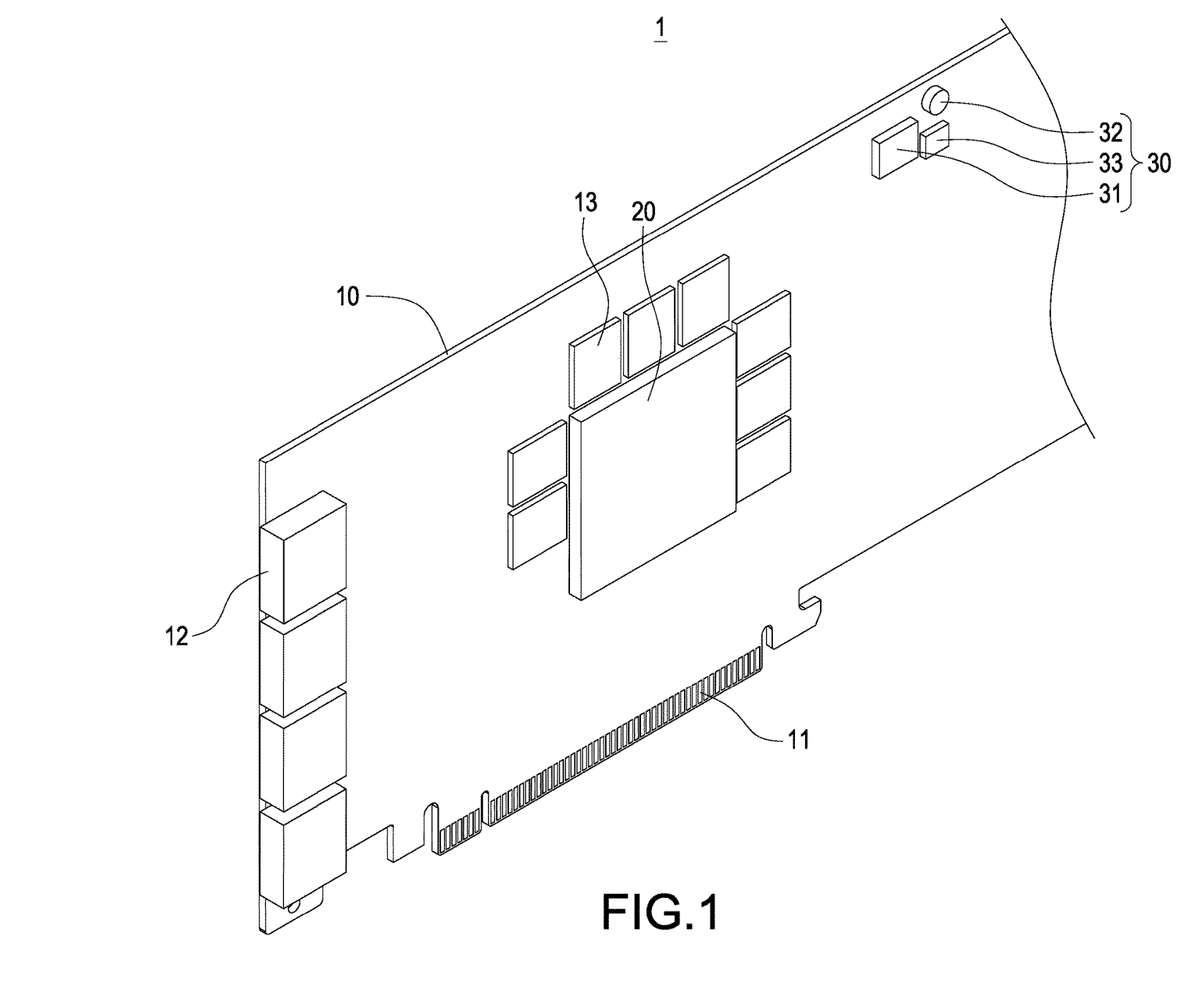
FIG. 1 is a perspective view of the display card with a noise reduction mechanism of the disclosure.
Figure 2:
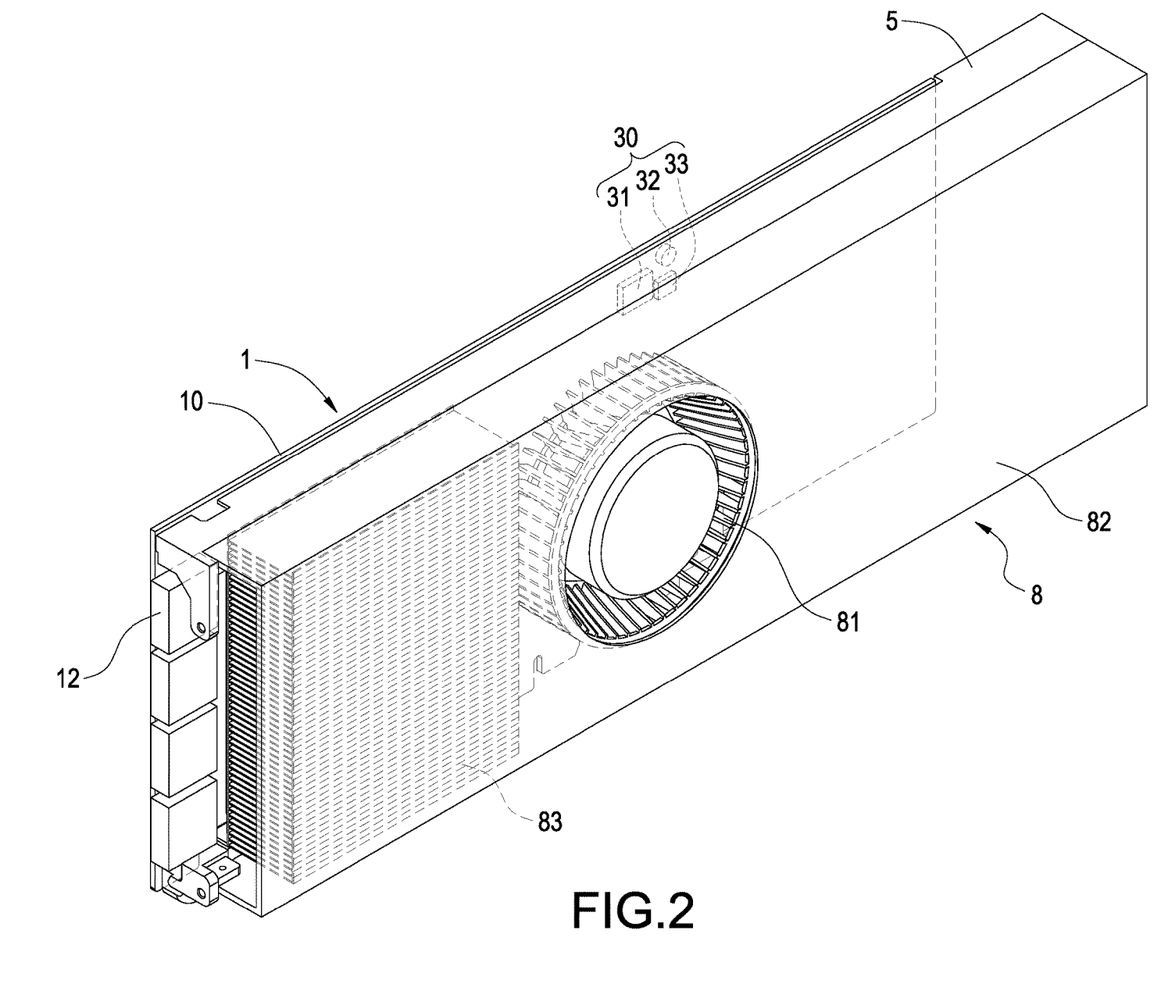
FIG. 2 is an assembled view of the display card with a noise reduction mechanism of the disclosure and the cooling device.
Figure 3:
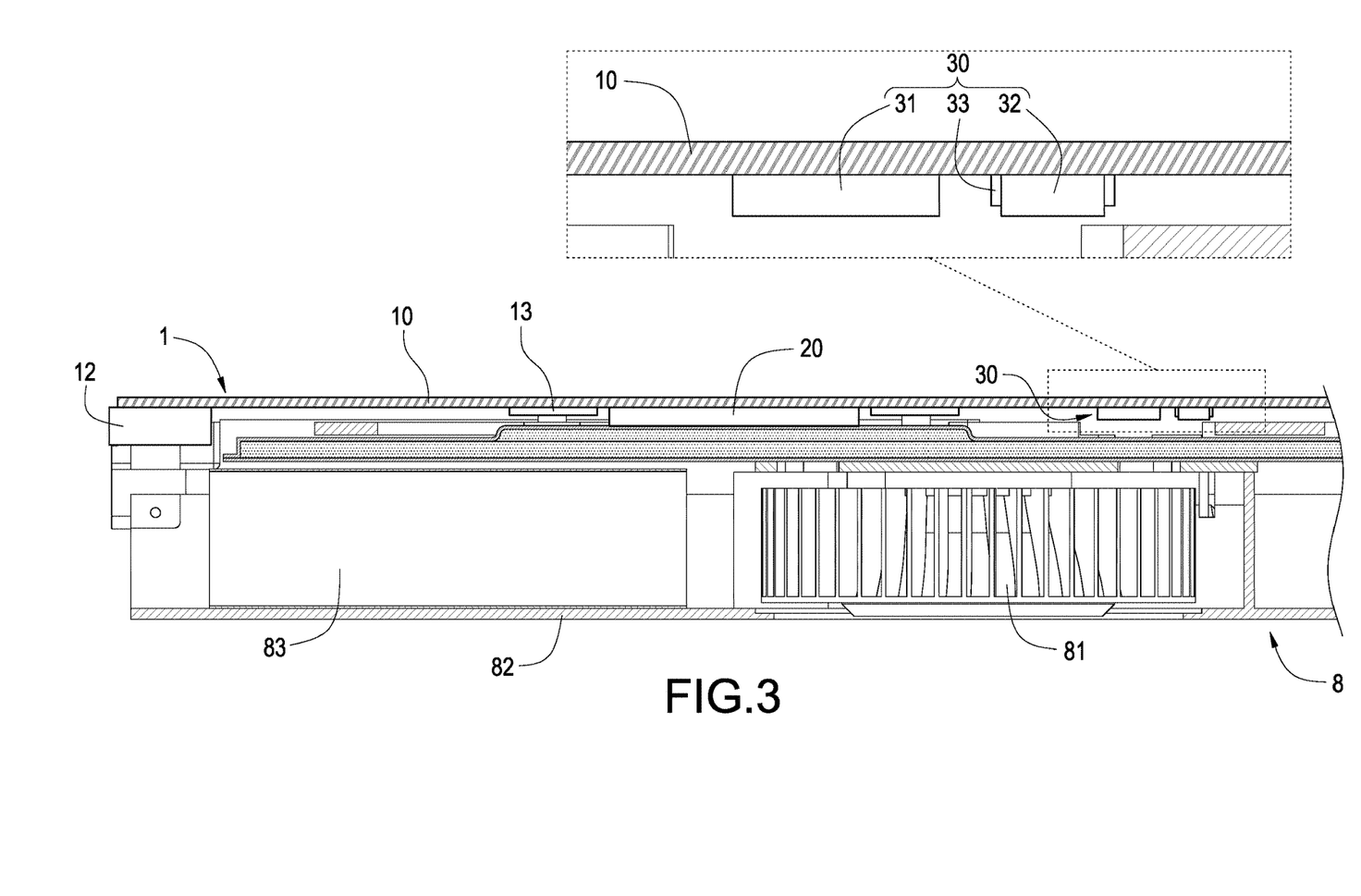
FIG. 3 is an assembled cross-sectional view of the display card with a noise reduction mechanism of the disclosure and the cooling device.
Figure 4:
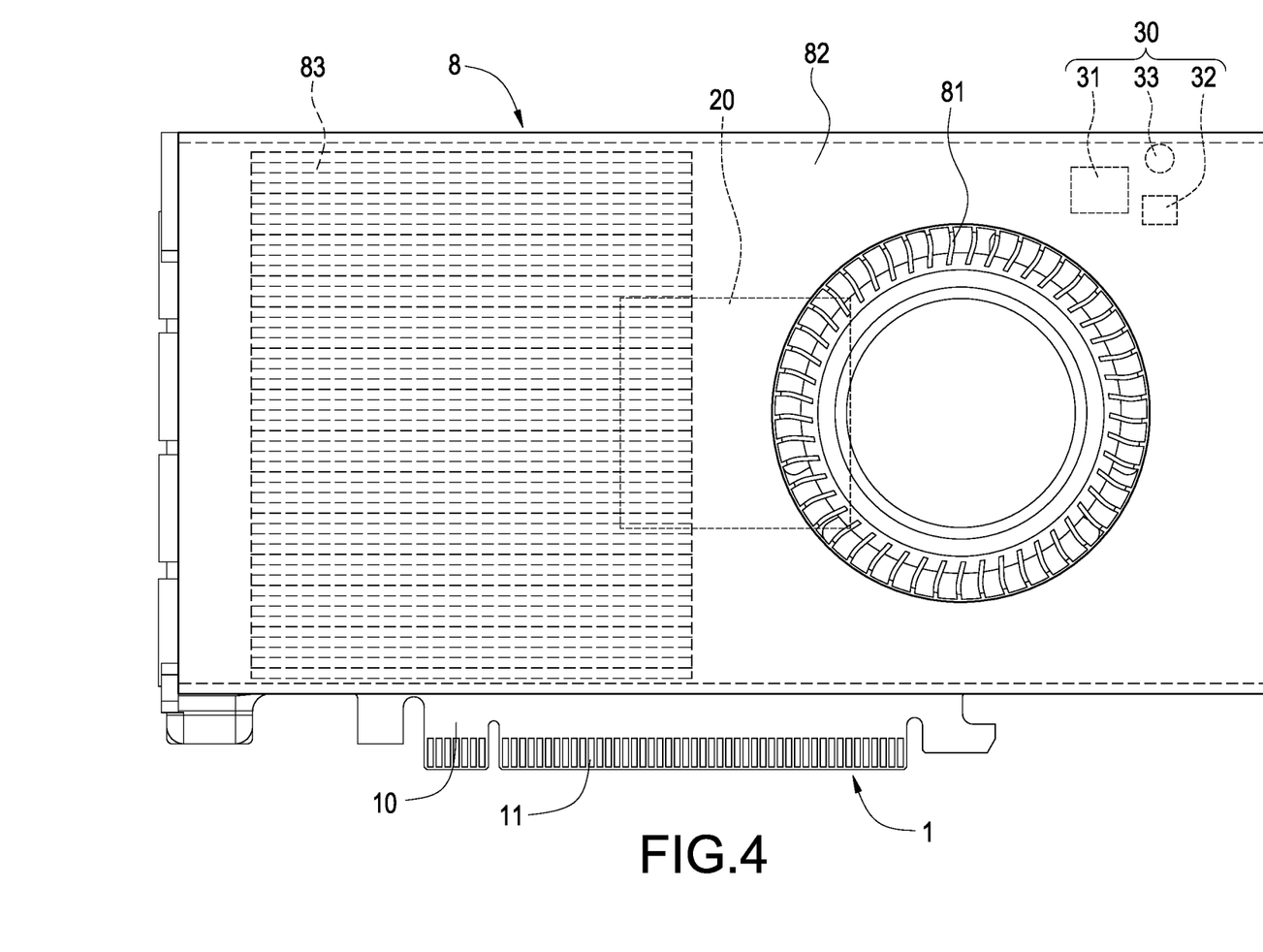
FIG. 4 is an assembled front view of the display card with a noise reduction mechanism of the disclosure and the cooling device.

Please refer to FIG. 1. The disclosure provides a display card with a noise reduction mechanism. The display card 1 includes a circuit board 10, a graphic processing unit 20 and a noise reduction module 30. A side of the circuit board has multiple gold fingers 11. The graphic processing unit (GPU) 20 is disposed on and electrically connected to the circuit board 10. The noise reduction module 30 is disposed on the circuit board 10 and electrically connected to a circuit on the circuit board 10. The noise reduction module 30 includes an active noise cancellation (ANC) 31 and a speaker 32 electrically connected to the active noise cancellation 31. The active noise cancellation 31 and the speaker 32 are directly fixed on the circuit board 10 and electrically connected to a circuit of the circuit board 10. The speaker 32 is capable of emitting a noise reduction sound to offset a noise from surrounding environment of the display card 1 by the noise reduction sound.

Figure 5:
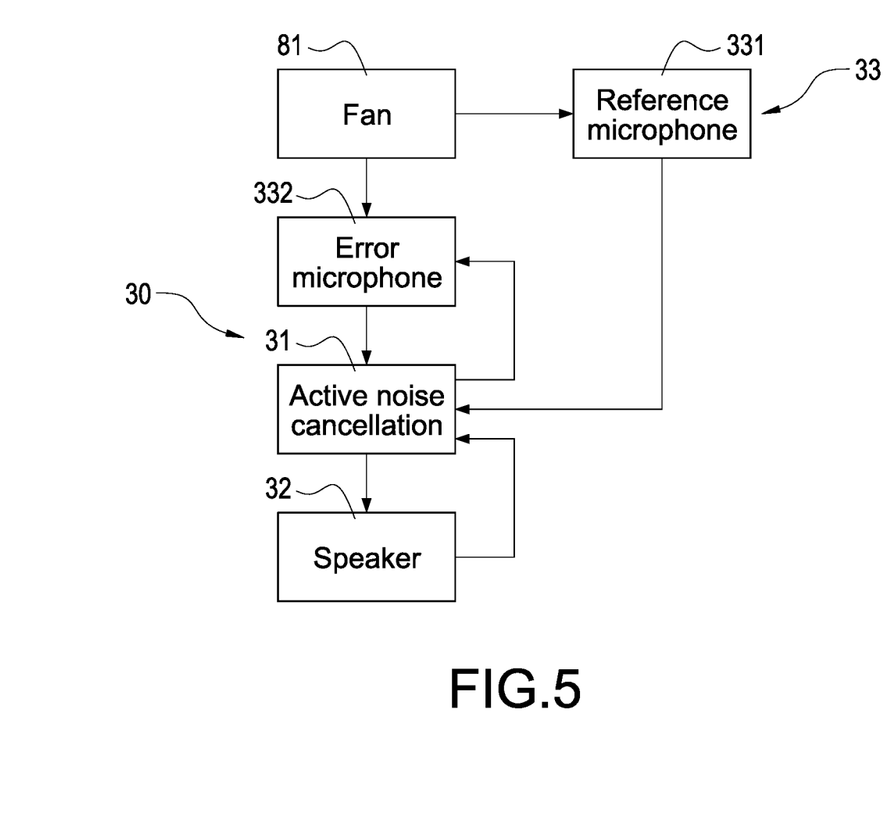
FIG. 5 is a block diagram of the display card with a noise reduction mechanism of the disclosure and the fan.

In an embodiment, the noise reduction module 30 further includes a microphone 33. The microphone 33 of the embodiment is fixed on the circuit board 10 and electrically connected to the active noise cancellation 31. The microphone 33 includes a reference microphone 331 and an error microphone 332 (as shown in FIG. 5).

In an embodiment, the circuit board 10 is further disposed with multiple graphic processing unit (GPU) signal I/O ports 12, which may be video graphics array (VGA) I/O ports or digital visual interfaces (DVIs). Also, the surrounding of the GPU 20 of the circuit board 10 is further disposed with multiple memories 13.

Please refer to FIGS. 2-5. After the display card with a noise reduction mechanism of the disclosure is assembled with a cooling device 8 and have operated, the GPU 20 of the display card 1 will generate a large amount of waste heat. The display card 1 and the cooling device 8 are connected by a bracket 5. The cooling device 8 includes a fan 81, a cover 82 and a cooler 83. The cooler 83 is attached on a surface of the GPU 20. The fan 81 is formed on a side of the cooler 83. The cover 82 covers the outsides of the cooler 83 and the fan 81. The noise reduction module 30 is disposed on the circuit board 10 with being adjacent to the surrounding of the fan 81.

The fan 81 operates according to a fan control signal. The larger the fan control signal value is, the faster the rotation speed of the motor in the fan 81 is and the stronger the cooling effect is, but the larger the noise is. In an embodiment, the fan control signal may be a square wave signal of pulse width modulation (PWM), which changes the rotation speed of the motor in the fan 81 by changing its duty cycle. The noise of the working fan 81 comes from the air flow caused by the rotation of the motor. The narrow frequency component might come from the thickness noise of the volume shift caused by the motion of the blades or the blade passing frequency (BPF) noise caused by the variable load capacity of the blade surfaces (including axial lift and fan surface pull). Since the BPF and related harmonics are related to the pressure disturbances generated as each blade passes a fixed reference point, a specific narrow frequency noise is generated when the blade tip generates periodic pressure waves. On the other hand, when the air flow passes through the fan blades, it will be stripped from the boundary layer of the fan blade or both sides of the blade tip to form alternating vortices. This phenomenon is called vortex shedding. The vortex shedding will make the instantaneous speeds of the fluid on both sides of the fan blades different, and the instantaneous pressures on both sides of the fan blades will be different under different fluid speeds, so the fan blades will vibrate and produce specific broad frequency noise.

The reference microphone 331 is disposed at a position adjacent to each blade of the fan 81 for capturing the noise of the working fan 81 and one of the measured wide frequency noise signals is sent to the active noise cancellation 31. The wide frequency noise signal includes the wide frequency noise spectrum of air flow noise generated by the working fan 81. In an embodiment, the reference microphone 331 may be a microphone of a digital micro electro mechanical system (MEMS), which has the functions of high heat resistance, high vibration resistance, high resistance to radio frequency interference, etc. However, the type of the reference microphone 331 does not limit the field of the disclosure.

The error microphone 332 is used to capture the overall noise of each blade of the working fan 81 and output a corresponding error signal to the active noise cancellation 31. The noise signal stands for the noise signal to be cancelled when each blade is rotating. Because the fan 81 is the primary noise source, the error microphone 332 may be disposed at a position adjacent to the fan 81. The distance between the reference microphone 331 and the active noise cancellation 31 is greater than the distance between the error microphone 332 and the active noise cancellation 31. The error microphone 332 may use a primary path and a secondary path the detect noise: the primary path relates to the signal transmission path between the fan 81 and the error microphone 332. The noise signal can be captured by the primary path. The secondary path relates to the signal transmission path between the speaker 32 and the error microphone 332. A corrected inverted noise signal of related inverted noise signals can be captured by the secondary path. In detail, the error signal output by the error microphone 332 is the difference between the noise signal and the corrected inverted noise signal. The less the error signal value is, the better the effect of noise reduction is. In an embodiment, the error microphone 332 may be a digital MEMS microphone, which has the functions of high heat resistance, high vibration resistance, high resistance to radio frequency interference, etc. However, the type of the reference microphone 331 does not limit the field of the disclosure.

The active noise cancellation 31 may receive a synchronous signal, receive the wide frequency noise signal from the reference microphone 331 and receive the error signal from the error microphone 332. The synchronous signal includes information related to the structure of the fan 81 (such the number of each fan blade) and the operation configuration (such as the motor rotation speed under different modes). According to the synchronous signal and the wide frequency noise signal, the active noise cancellation 31 may calculate the wideband noise of the noise generated by the working fan 81. According to the synchronous signal and the error signal, the active noise cancellation 31 may calculate the narrowband noise of the noise generated by the working fan 81. According to the wideband noise and the narrowband noise, the active noise cancellation 31 may provide a control signal to the speaker to drive the speaker 32 to make the inverted noise signal provided by the speaker 32 capable of effectively offsetting the noise signal, i.e., the error signal is lowered to zero as possible.

The speaker 32 is an electronic element that may convert an electronic signal into an audio signal and usually includes a diaphragm and a driving circuit composed of an electromagnet and a voice coil. The speaker 32 may operate according to a speaker control signal provided by the active noise cancellation 31. When the current of the speaker control signal passes through the voice coil, the voice coil vibrates with the frequency of the current and the diaphragm connected with the voice coil also vibrates to push the surrounding air to generate a noise reduction sound. In the embodiment of the disclosure, the diaphragm of the speaker 32 may generate an inverted noise signal according to the speaker control signal.

Figure 6:
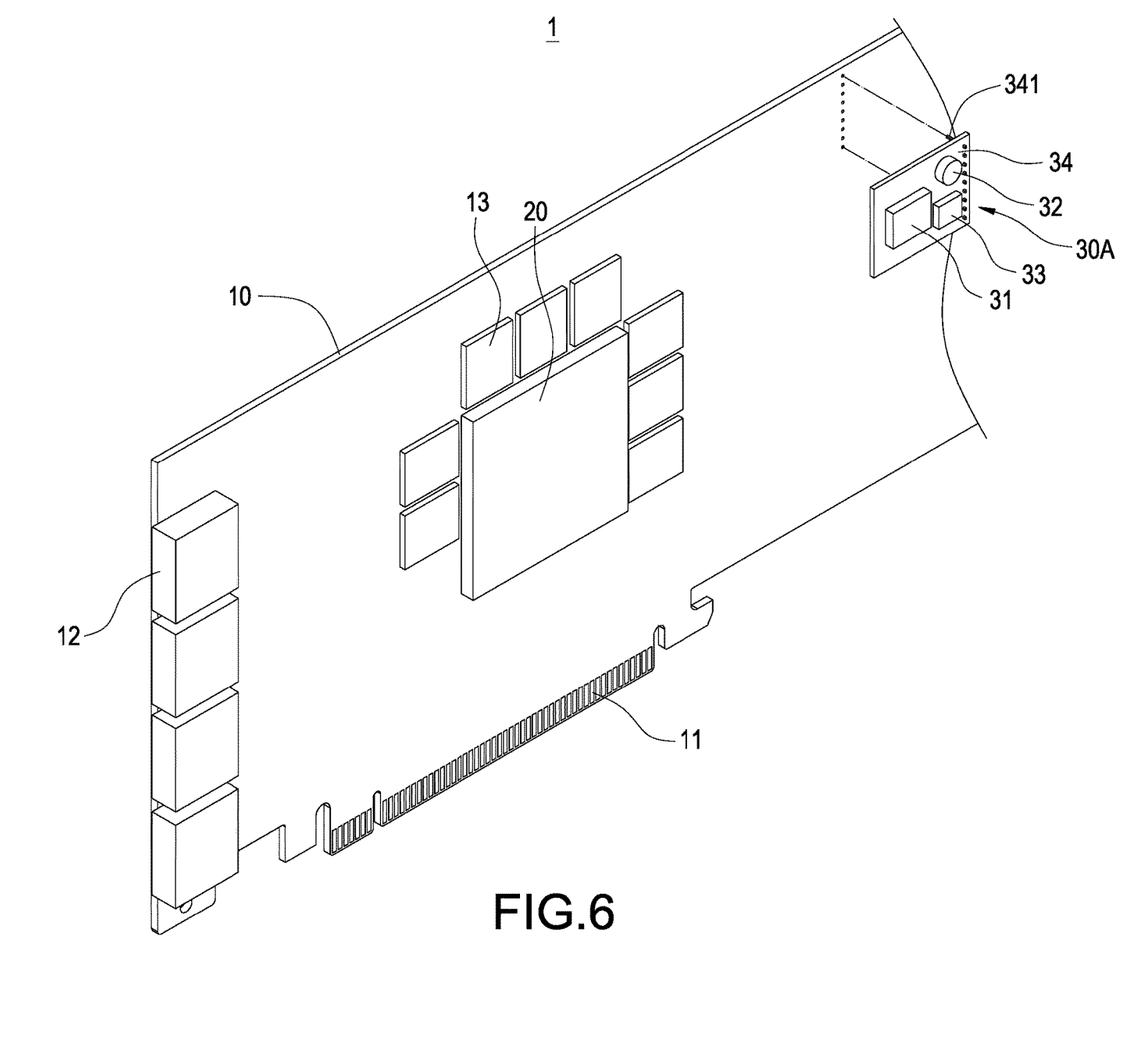
FIG. 6 is an exploded view of another embodiment of the disclosure.
Figure 7:
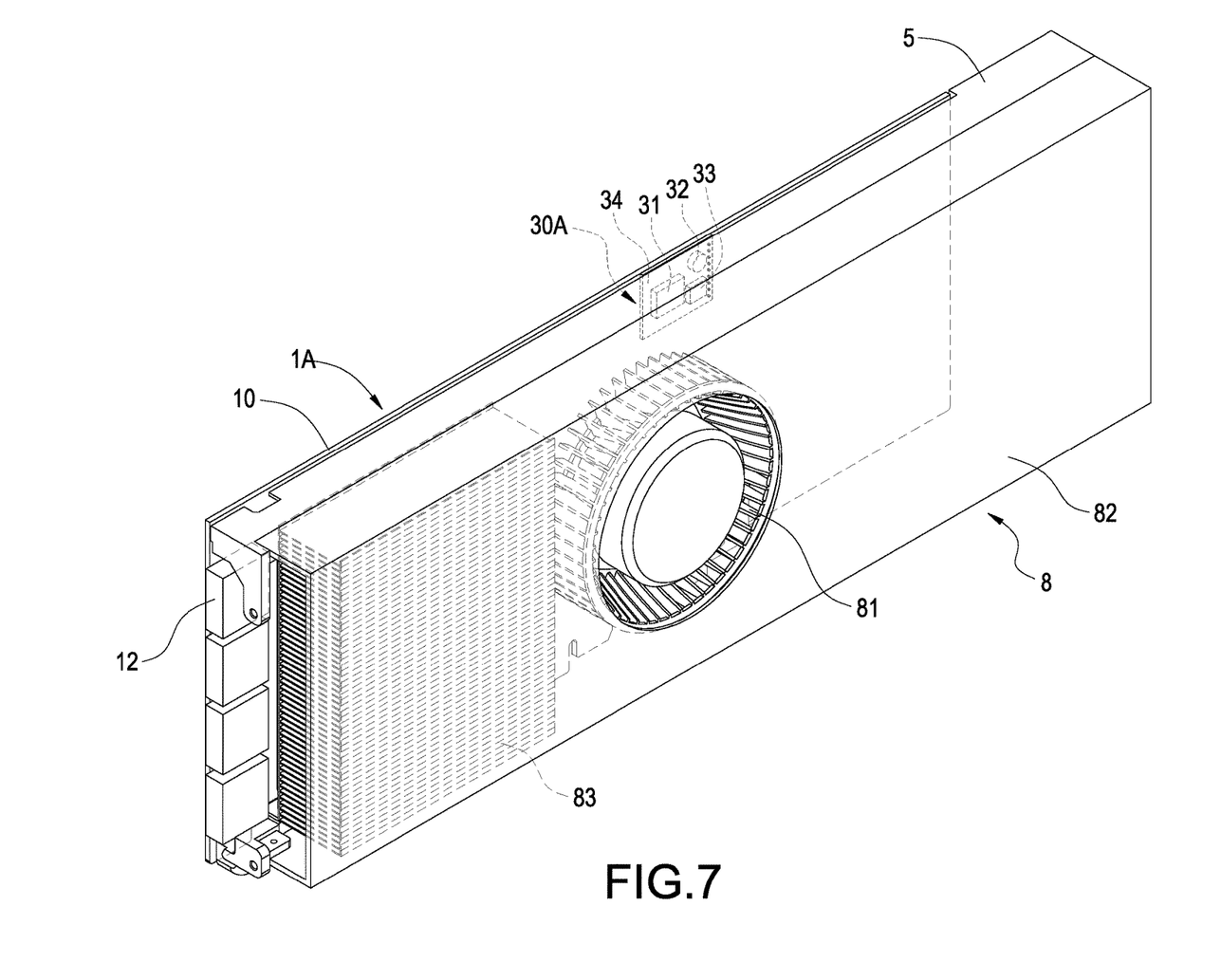
FIG. 7 is an assembled view of the another embodiment of the disclosure and the cooling device.
Figure 8:
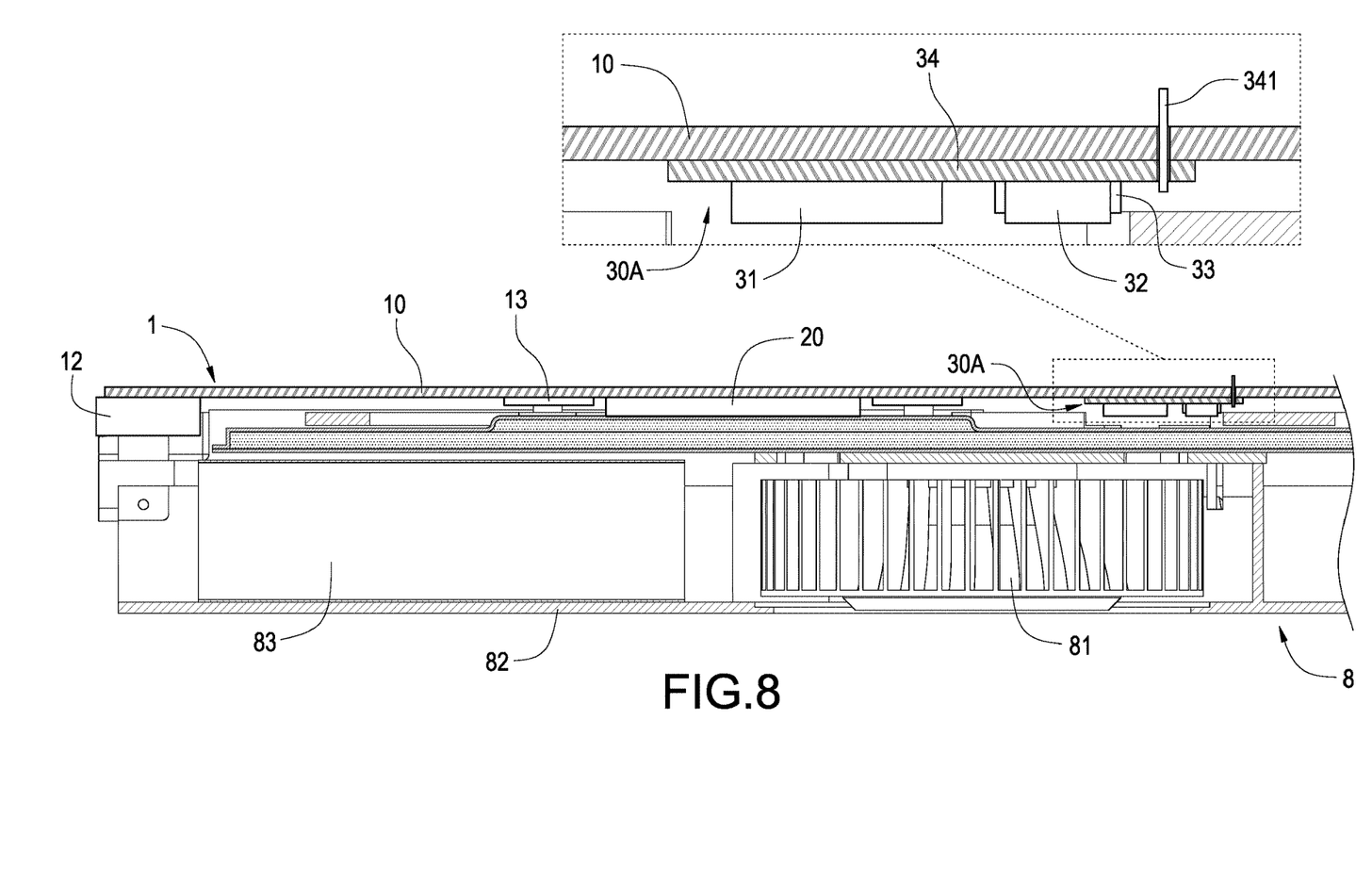
FIG. 8 is an assembled cross-sectional view of the another embodiment of the disclosure and the cooling device.

Please refer to FIGS. 6-8. The display card 1A of the embodiment is substantially the same as the display card 1 of the above embodiment. The difference is that the noise reduction module 30A further includes a secondary circuit board 34. The secondary circuit board 34 is fixed on the above circuit board 10 and electrically connected to a circuit of the circuit board 10. The active noise cancellation 31 and the speaker 32 are fixed on the secondary circuit board 34 and electrically connected to a circuit of the secondary circuit board 34.

In an embodiment, the noise reduction module 30A further includes a microphone 33. The microphone 33 of the embodiment is fixed on the secondary circuit board 34 and electrically connected to the active noise cancellation 31. The microphone 33 includes a reference microphone 331 and an error microphone 332 (as shown in FIG. 5).

In an embodiment, the secondary circuit board 34 includes multiple insert terminals 341. The secondary circuit board 34 is electrically connected with the circuit board 10 by each insert terminal 341.

Figure 9:
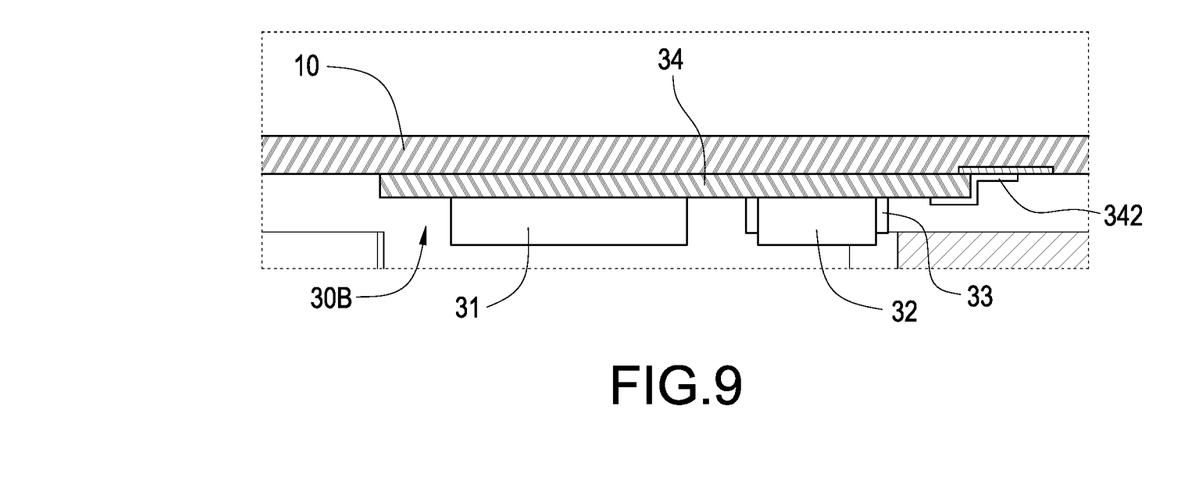
FIG. 9 is a partially cross-sectional view of still another embodiment of the disclosure and the cooling device.

Please refer to FIG. 9. The noise reduction module 30B of the embodiment further includes a secondary circuit board 34. The secondary circuit board 34 includes multiple press terminals 342. The secondary circuit board 34 is electrically connected with the circuit board 10 by each press terminal 342.

While this disclosure has been described by means of specific embodiments, numerous modifications and variations could be made thereto by those skilled in the art without departing from the scope and spirit of this disclosure set forth in the claims.

What is claimed is:

1. A display card with a noise reduction mechanism, comprising:
 a circuit board, comprising multiple gold fingers;
 a graphic processing unit, disposed on the circuit board; and
 a noise reduction module, disposed on and electrically connected to the circuit board, comprising an active noise cancellation and a speaker electrically connected to the active noise cancellation, the speaker being capable of emitting a noise reduction sound to offset a noise from surrounding environment by the noise reduction sound.

2. The display card of claim 1, wherein the active noise cancellation and the speaker are fixed on and electrically connected to the circuit board.

3. The display card of claim 2, wherein the noise reduction module further comprises a microphone, and the microphone is fixed on the circuit board and electrically connected to the active noise cancellation.

4. The display card of claim 3, wherein the microphone comprises a reference microphone and an error microphone.

5. The display card of claim 1, wherein the noise reduction module further comprises a microphone, and the microphone is fixed on the circuit board and electrically connected to the active noise cancellation.

6. The display card of claim 5, wherein the microphone comprises a reference microphone and an error microphone.

7. The display card of claim 1, wherein the noise reduction module further comprises a secondary circuit board, the secondary circuit board is fixed on and electrically connected to the circuit board, and the active noise cancellation and the speaker are fixed on and electrically connected to the secondary circuit board.

8. The display card of claim 7, wherein the noise reduction module further comprises a microphone, and the microphone is fixed on the secondary circuit board and electrically connected to the active noise cancellation.

9. The display card of claim 8, wherein the microphone comprises a reference microphone and an error microphone.

10. The display card of claim 1, wherein the noise reduction module further comprises a secondary circuit board, the active noise cancellation and the speaker are fixed on and electrically connected to the secondary circuit board, the secondary circuit board comprises multiple insert terminals, and the secondary circuit board is electrically connected with the circuit board by each insert terminal.

11. The display card of claim 1, wherein the noise reduction module further comprises a secondary circuit board, the active noise cancellation and the speaker are fixed on and electrically connected to the secondary circuit board, the secondary circuit board comprises multiple press terminals, and the secondary circuit board is electrically connected with the circuit board by each press terminal.

* * * * *